United States Patent
Lu et al.

(10) Patent No.: US 8,804,591 B2
(45) Date of Patent: Aug. 12, 2014

(54) METHOD AND APPARATUS FOR MULTICAST MOBILITY

(75) Inventors: Guang Lu, Montreal (CA); Shamim A. Rahman, Cote St. Luc (CA); Juan Carlos Zuniga, Montreal (CA); Michelle Perras, Montreal (CA); Catherine M. Livet, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 192 days.

(21) Appl. No.: 12/885,218

(22) Filed: Sep. 17, 2010

(65) Prior Publication Data

US 2011/0110286 A1    May 12, 2011

Related U.S. Application Data

(60) Provisional application No. 61/243,810, filed on Sep. 18, 2009, provisional application No. 61/315,459, filed on Mar. 19, 2010.

(51) Int. Cl.
| | | |
|---|---|---|
| *H04H 20/71* | (2008.01) | |
| *H04L 12/18* | (2006.01) | |
| *H04W 8/08* | (2009.01) | |
| *H04W 80/04* | (2009.01) | |
| *H04W 60/00* | (2009.01) | |
| *H04W 36/00* | (2009.01) | |

(52) U.S. Cl.
CPC ............ *H04W 8/085* (2013.01); *H04W 80/045* (2013.01); *H04L 12/189* (2013.01); *H04L 12/1877* (2013.01); *H04W 60/005* (2013.01); *H04L 12/185* (2013.01); *H04W 36/0016* (2013.01)
USPC .......................................................... 370/312

(58) Field of Classification Search
None
See application file for complete search history.

(56) References Cited

U.S. PATENT DOCUMENTS

| | | |
|---|---|---|
| 7,467,284 B2 | 12/2008 | Dekker et al. |
| 8,155,078 B2 | 4/2012 | Ahmavaara et al. |

(Continued)

FOREIGN PATENT DOCUMENTS

| | | |
|---|---|---|
| JP | 2006-270588 | 10/2006 |
| WO | 0221761 A1 | 3/2002 |

(Continued)

OTHER PUBLICATIONS

Schmidt et al., "A Minimal Deployment Option for Multicast Listeners in PMIPv6 Domains, draft-schmidt-multimob-pmipv6-mcast-deployment-01," Network Working Group, Internet—Draft (Jun. 29, 2009).

Zuniga et al., "Support Multicast Services Using Proxy Mobile IPv6, draft-zuniga-multimob-smspmip-00.txt," MULTIMOB Group, Internet Draft (Oct. 15, 2009).

(Continued)

*Primary Examiner* — Otis L Thompson, Jr.
(74) *Attorney, Agent, or Firm* — Volpe and Koenig, P.C.

(57) ABSTRACT

A method and an apparatus for a proxy mobile Internet protocol (PMIP) supporting a dedicated multicast local mobility anchor (LMA) and mobile access gateway (MAG) is provided. The LMA assigns an Internet Protocol (IP) address to a wireless transmit receive unit (WTRU) that processes the IP address and sends a router solicitation message to a serving MAG. A WTRU is disclosed to receive a first IP address that is for unicast service and a second IP address that is for multicast services. Generally, the method and apparatus proposes architecture, interfaces, and procedures to enable multicast mobility using Proxy Mobile IP. More specifically operations of aggregated PMIP tunnels for multicast services are described. Multicast mobility is enabled when mobile nodes move from one MAG to another MAG, intra-LMA, and inter-LMA. And, Multicast mobility is enabled between bidirectional network and downlink only multicast network in a hybrid network.

16 Claims, 13 Drawing Sheets

(56) References Cited

U.S. PATENT DOCUMENTS

| | | | |
|---|---|---|---|
| 2001/0033656 A1 | 10/2001 | Gligor et al. | |
| 2005/0027881 A1* | 2/2005 | Figueira et al. | 709/238 |
| 2008/0304441 A1 | 12/2008 | Tsirtsis | |
| 2009/0037763 A1 | 2/2009 | Adhya et al. | |
| 2009/0073935 A1* | 3/2009 | Xia et al. | 370/331 |
| 2009/0313118 A1* | 12/2009 | Akiyoshi | 705/14.49 |
| 2010/0265869 A1* | 10/2010 | Sarikaya | 370/312 |
| 2011/0032874 A1* | 2/2011 | Kim et al. | 370/328 |
| 2011/0149839 A1* | 6/2011 | Toyokawa et al. | 370/328 |
| 2012/0106507 A1* | 5/2012 | Venkataswami et al. | 370/331 |
| 2012/0120872 A1* | 5/2012 | Korhonen et al. | 370/328 |

FOREIGN PATENT DOCUMENTS

| | | | |
|---|---|---|---|
| WO | 2005029756 A2 | 3/2005 | |
| WO | 2006129293 A1 | 12/2006 | |
| WO | 2009/018241 | 2/2009 | |
| WO | 2009/057296 | 5/2009 | |

OTHER PUBLICATIONS

Asaeda et al., "PMIPv6 Extensions for Multicast, draft-asaeda-multimob-pmip6-extension-02," MULTIMOB Group, Internet-Draft (Jul. 13, 2009).

Gundavelli, et al., "Proxy Mobile IPv6," RFC 5213, Aug. 2008. Available at http://www.rfc-editor.org/rfc/rfc5213.txt.

"PMIPv6 Extensions for Multicast draft-asaeda-multimob-pmip6-extension-02," IETF; STANDARDWORKINGDRAFT, pp. 1 to 27 (Jul. 2009).

"Proxy Mobile IPv6 Based Multicast Listener Mobility Architecture," Wireless Communications and Networking Conference, WCNC 2009, IEEE (Apr. 2009).

Schmidt et al., "A Minimal Deployment Option for Multicast Listeners in PMIPv6 Domains, draft-schmidt-multimob-pmipv6-mcast-deployment-01," Network Working Group, Internet-Draft (Jun. 29, 2009).

Zuniga et al., "Support Multicast Services Using Proxy Mobile IPv6, draft-zuniga-multimob-smspmip-00.txt," Multimob Group, Internet Draft (Oct. 15, 2009).

* cited by examiner

METHOD AND APPARATUS FOR MULTICAST MOBILITY

CROSS REFERENCE TO RELATED APPLICATION

This application claims the benefit of U.S. Provisional Application Ser. No. 61/243,810 filed on Sep. 18, 2009; and U.S. Provisional Application Ser. No. 61/315,459 filed on Mar. 19, 2010, all of which are hereby incorporated by reference as if fully set forth herein.

FIELD OF INVENTION

This application is related to mobile communications.

BACKGROUND

Existing downlink only multicast networks, such as digital video broadcasting (DVB), media forward link only (Media-FLO), and the like, have significant limitations. Network coverage is usually regional and therefore a wireless transmit receive unit (WTRU), or a mobile node, loses access to the multicast service when the WTRU moves beyond a coverage area. While a WTRU may be able to re-subscribe and receive the service over a bi-directional communication network, all of the session continuity is lost.

In existing bi-directional mobile communication networks (e.g., third generation partnership program (3GPP), multimedia broadcast multicast services (MBMS), and the like), mobility is only addressed within each respective standard. Inter-technology mobility also does not support the multicast services.

In existing hybrid networks such as overlaid downlink only and bi-directional networks, mobility may be supported at the application level with the open mobile alliance digital mobile broadcast enabler (OMA BCAST). These types of hybrid networks typically utilize a break-before-make service, which often results in long service interruptions.

FIG. 1 illustrates the architecture of a proxy mobile internet protocol (IP)v6 (PMIPv6) domain. The PMIP has been introduced for network-based mobility management. The core functional entities in the network-based localized mobility management (NETLMM) infrastructure are a local mobility anchor (LMA) and a mobile access gateway (MAG) 106. There maybe multiple local mobility anchors (LMAs) 102 in a PMIPv6 domain each serving a different group of WTRUs. The LMA 102 is responsible for maintaining the reachability state of the WTRU 108 and is the topological anchor point for WTRU's 108 home network prefixes (HNP). The MAG 106 is the entity that performs the mobility management on behalf of the WTRU 108, and it resides on the access link where the WTRU 108 is anchored. The MAG 106 is responsible for detecting the movement of the WTRU 108 to and from the access link and for initiating binding registration to the WTRU's 108 LMA 102. The WTRU 108 may be an IPv4-only node, IPv6-only node, or a dual-stack node.

The WTRU's home network prefix (WTRU-HNP) 110 is a prefix assigned to the link between the WTRU 108 and the MAG 106. More than one prefix may be assigned to the link between the WTRU 108 and the MAG 106. The proxy care-of address (Proxy-CoA) 112 is the global address configured on the egress interface of the MAG 106 and is the transport endpoint of the tunnel between the LMA 102 and the MAG 106. The LMA address (LMAA) 114 is the global address that is configured on the interface of the LMA 102 and is the transport endpoint of the bi-directional tunnel established between the LMA 102 and the MAG 106. The IPv4/IPv6 network 104 refers to the network where the mobility management of a WTRU 108 is handled using PMIPv4/PMIPv6. The PMIPv4/PMIPv6 104 includes LMAs 102 and MAGs 106 between which security associates may be set up and authorization for sending proxy binding updates on behalf of the WTRUs 108 may be ensured.

These types of existing Layer 3 mobility protocols (e.g., PMIP, session initiation protocol (SIP), and the like) are designed for unicast traffic. They lack support for multicast services. Further, existing multicast protocols such as internet group management protocol (IGMP) or multicast listener discovery (MLD) need to be enhanced to reduce the latency inherent in resuming multicast services after handover.

A method and an apparatus to enable enhanced mobility for the existing and evolving multicast services, such as multicast multimedia (e.g., mobile TV, radio, presence, microblogging, file sharing, podcast, social networking, and the like) is desired.

SUMMARY

A method and an apparatus for a PMIP supporting a dedicated multicast LMA is provided, including, one option for a first LMA assigning an IP address to a WTRU subscribed for both unicast services and multicast services, a WTRU processing received IP address and sending a router solicitation message to a serving MAG, and the serving MAG triggering a proxy binding update (PBU) message to the first LMA.

In another option, a method implemented in a WTRU including a receiver configured to receive two sets of IP addresses, wherein one set of IP addresses is for unicast services and another set of IP addresses is for multicast services, a processor configured to use the one set of IP addresses for unicast services and the other set of IP addresses for multicast services, and a transmitter configured to transmit a router solicitation message to a serving MAG triggering two PBU messages, one from the serving MAG to the unicast LMA, and one from the serving MAG to the multicast LMA.

Generally, the method and apparatus proposed includes an architecture, interface, and procedures to enable multicast mobility using Proxy Mobile IP. More specifically, several solutions are described in the following areas. Operations of aggregated PMIP tunnels for multicast services are described. A new architecture to have a dedicated LMA as multicast anchor, and a new PMIP procedure on IP address assignment, MAG functionalities, and WTRU's profile are introduced. Multicast mobility is enabled when mobile nodes move from one MAG to another MAG, intra-LMA, and inter-LMA. MLD/IGMP enhancements to reduce latency in resuming multicast services are described. And, multicast mobility is enabled between bidirectional network and downlink only multicast network in a hybrid network.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, a mobile node (MN), or any other type of device capable of operating in a wireless environment. When referred to hereafter, the terminology "base station" includes but is not limited to a Node-B, a site controller, an access point (AP), an evolved Node-B (eNB), a router, a gateway, or any other type of interfacing device capable of operating in a wireless environment.

Method and apparatus disclosed herewith enhances layer 3 mobility for PMIP and may be applied to different access technologies regardless of link layer or physical layer. Both unicast and multicast can be used for transmissions. However, using multicast at lower layers, together with the L3 mulitcast mobility support may enhance the overall system efficiency. Embodiments presented herewith enable the advantages of multicast transmissions at lower layers. For example, MBMS can be used in long term evolution (LTE) and physical multicast channel (PMCH), multicast control channel (MCCH), and multicast traffic channel (MTCH) can be used to carry the multicast data.

Figure 1:
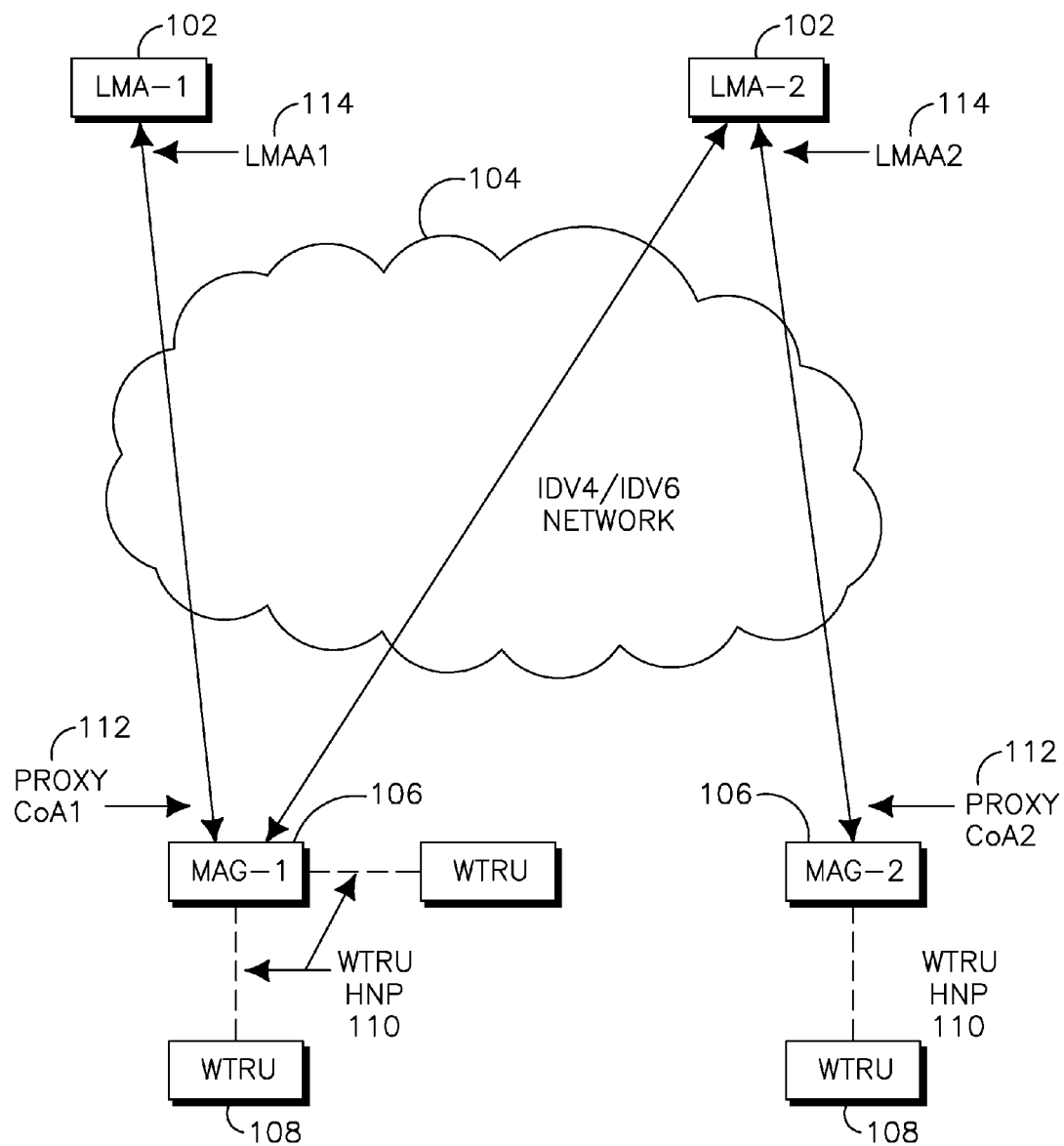
FIG. 1 illustrates an architecture of proxy mobile IPv6 domain.
Figure 2A:
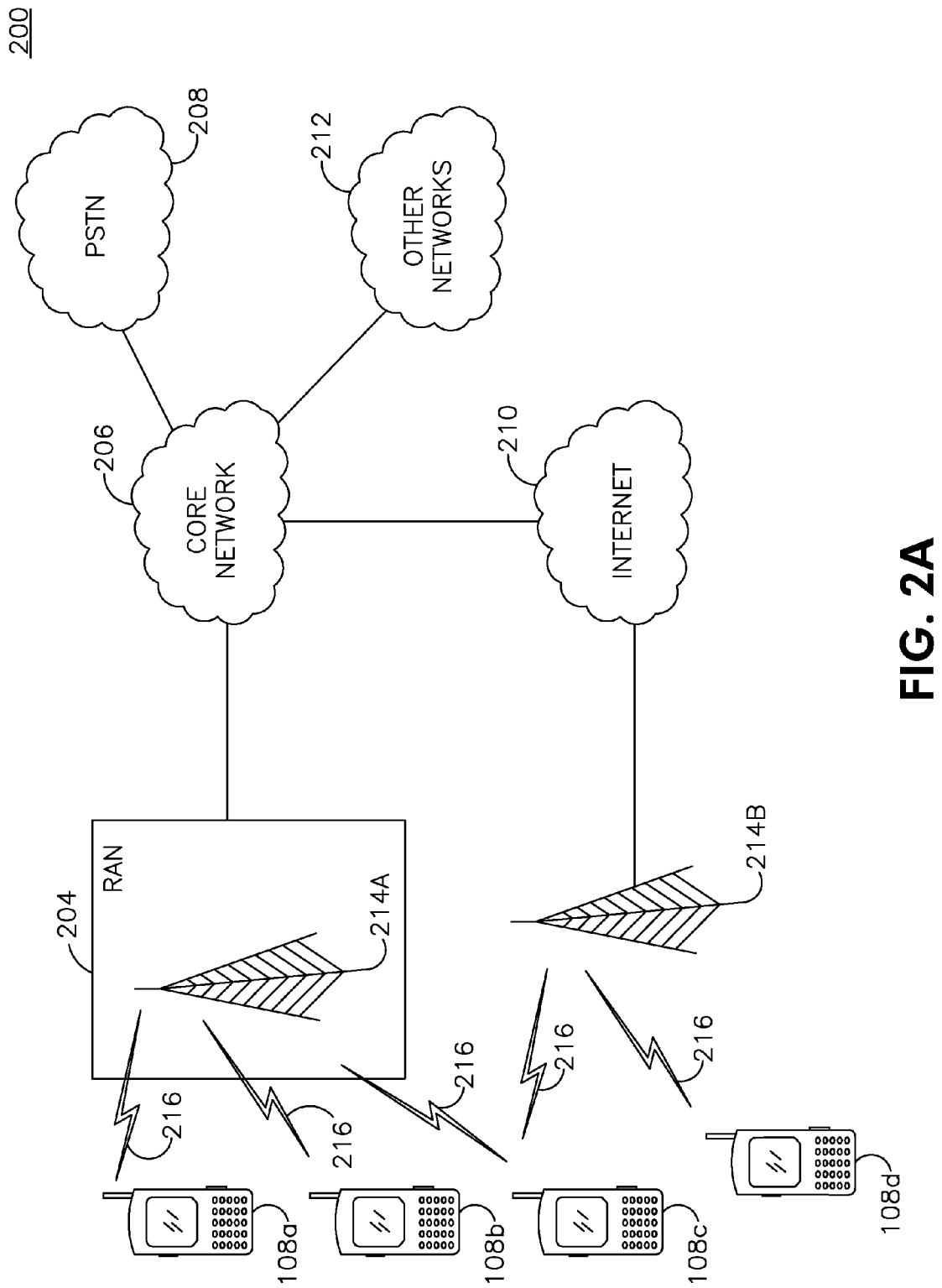
FIG. 2A is a system diagram of an example communications system in which one or more disclosed embodiments may be implemented.

FIG. 2A is a diagram of an example communications system 200 in which one or more disclosed embodiments may be implemented. The communications system 200 may be a multiple access system that provides content, such as voice, data, video, messaging, broadcast, etc., to multiple wireless users. The communications system 200 may enable multiple wireless users to access such content through the sharing of system resources, including wireless bandwidth. For example, the communications systems 200 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 2A, the communications system 200 may include wireless transmit/receive units (WTRUs) 108a, 108b, 108c, 108d, a radio access network (RAN) 204, a core network 206, a public switched telephone network (PSTN) 208, the Internet 210, and other networks 212, though it will be appreciated that the disclosed embodiments contemplate any number of WTRUs, base stations, networks, and/or network elements. Each of the WTRUs 108a, 108b, 108c, 108d may be any type of device configured to operate and/or communicate in a wireless environment. By way of example, the WTRUs 108a, 108b, 108c, 108d may be configured to transmit and/or receive wireless signals and may include user equipment (UE), a mobile station, a mobile node, a fixed or mobile subscriber unit, a pager, a cellular telephone, a personal digital assistant (PDA), a smartphone, a laptop, a netbook, a personal computer, a wireless sensor, consumer electronics, and the like.

The communications systems 200 may also include a base station 214a and a base station 214b. Each of the base stations 214a, 214b may be any type of device configured to wirelessly interface with at least one of the WTRUs 108a, 108b, 108c, 108d to facilitate access to one or more communication networks, such as the core network 206, the Internet 210, and/or the networks 212. By way of example, the base stations 214a, 214b may be a base transceiver station (BTS), a Node-B, an eNode B, a Home Node B, a Home eNode B, a site controller, an access point (AP), a wireless router, and the like. While the base stations 214a, 214b are each depicted as a single element, it will be appreciated that the base stations 214a, 214b may include any number of interconnected base stations and/or network elements.

The base station 214a may be part of the RAN 204, which may also include other base stations and/or network elements (not shown), such as a base station controller (BSC), a radio network controller (RNC), relay nodes, etc. The base station 214a and/or the base station 214b may be configured to transmit and/or receive wireless signals within a particular geographic region, which may be referred to as a cell (not shown). The cell may further be divided into cell sectors. For example, the cell associated with the base station 214a may be divided into three sectors. Thus, in one embodiment, the base station 214a may include three transceivers, i.e., one for each sector of the cell. In another embodiment, the base station 214a may employ multiple-input multiple output (MIMO) technology and, therefore, may utilize multiple transceivers for each sector of the cell.

The base stations 214a, 214b may communicate with one or more of the WTRUs 108a, 108b, 108c, 108d over an air interface 216, which may be any suitable wireless communication link (e.g., radio frequency (RF), microwave, infrared (IR), ultraviolet (UV), visible light, etc.). The air interface 216 may be established using any suitable radio access technology (RAT).

More specifically, as noted above, the communications system 200 may be a multiple access system and may employ one or more channel access schemes, such as CDMA, TDMA, FDMA, OFDMA, SC-FDMA, and the like. For example, the base station 214a in the RAN 204 and the WTRUs 108a, 108b, 108c may implement a radio technology such as Universal Mobile Telecommunications System (UMTS) Terrestrial Radio Access (UTRA), which may establish the air interface 216 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 214a and the WTRUs 108a, 108b, 108c may implement a radio technology such as Evolved UMTS Terrestrial Radio Access (E-UTRA), which may establish the air interface 216 using Long Term Evolution (LTE) and/or LTE-Advanced (LTE-A).

In other embodiments, the base station 214a and the WTRUs 108a, 108b, 108c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 214b in FIG. 2A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 214b and the WTRUs 108c, 108d may implement a radio technology such as IEEE 802.11 to establish a wireless local area network (WLAN). In another embodiment, the base station 214b and the WTRUs 108c, 108d may implement a radio technology such as IEEE 802.15 to establish a wireless personal area network (WPAN). In yet another embodiment, the base station 214b and the WTRUs 108c, 108d may utilize a cellular-based RAT (e.g., WCDMA, CDMA2000, GSM, LTE, LTE-A, etc.) to establish a picocell or femtocell. As shown in FIG. 2A, the base station 214b may have a direct connection to the Internet 210. Thus, the base station 214b may not be required to access the Internet 210 via the core network 206.

The RAN 204 may be in communication with the core network 206, which may be any type of network configured to provide voice, data, applications, and/or voice over internet protocol (VoIP) services to one or more of the WTRUs 108a, 108b, 108c, 108d. For example, the core network 206 may provide call control, billing services, mobile location-based services, pre-paid calling, Internet connectivity, video distribution, etc., and/or perform high-level security functions, such as user authentication. Although not shown in FIG. 2A, it will be appreciated that the RAN 204 and/or the core network 206 may be in direct or indirect communication with other RANs that employ the same RAT as the RAN 204 or a different RAT. For example, in addition to being connected to the RAN 204, which may be utilizing an E-UTRA radio technology, the core network 206 may also be in communication with another RAN (not shown) employing a GSM radio technology.

The core network 206 may also serve as a gateway for the WTRUs 108a, 108b, 108c, 108d to access the PSTN 208, the Internet 210, and/or other networks 212. The PSTN 208 may include circuit-switched telephone networks that provide plain old telephone service (POTS). The Internet 210 may include a global system of interconnected computer networks and devices that use common communication protocols, such as the transmission control protocol (TCP), user datagram protocol (UDP) and the internet protocol (IP) in the TCP/IP internet protocol suite. The networks 212 may include wired or wireless communications networks owned and/or operated by other service providers. For example, the networks 212 may include another core network connected to one or more RANs, which may employ the same RAT as the RAN 204 or a different RAT.

Some or all of the WTRUs 108a, 108b, 108c, 108d in the communications system 200 may include multi-mode capabilities, i.e., the WTRUs 108a, 108b, 108c, 108d may include multiple transceivers for communicating with different wireless networks over different wireless links. For example, the WTRU 108c shown in FIG. 2A may be configured to communicate with the base station 214a, which may employ a cellular-based radio technology, and with the base station 214b, which may employ an IEEE 802 radio technology.

Figure 2B:
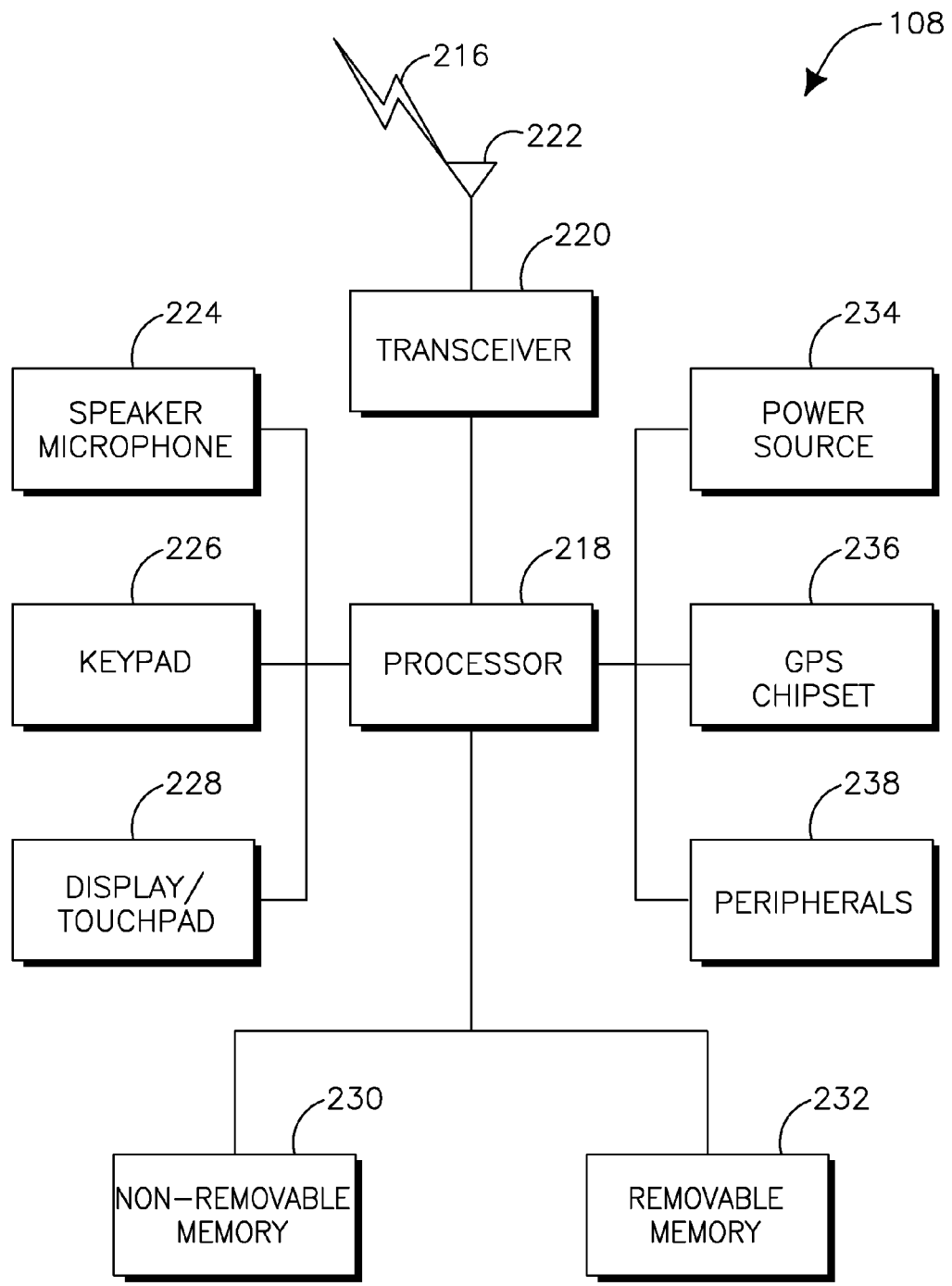
FIG. 2B is a system diagram of an example wireless transmit/receive unit (WTRU) that may be used within the communications system illustrated in FIG. 2A.

FIG. 2B is a system diagram of an example WTRU 108. As shown in FIG. 2B, the WTRU 108 may include a processor 218, a transceiver 220, a transmit/receive element 222, a speaker/microphone 224, a keypad 226, a display/touchpad 228, non-removable memory 206, removable memory 232, a power source 234, a global positioning system (GPS) chipset 236, and other peripherals 238. It will be appreciated that the WTRU 108 may include any sub-combination of the foregoing elements while remaining consistent with an embodiment.

The processor 218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 218 may perform signal coding, data processing, power control, input/output processing, and/or any other functionality that enables the WTRU 108 to operate in a wireless environment. The processor 218 may be coupled to the transceiver 220, which may be coupled to the transmit/receive element 222. While FIG. 2B depicts the processor 218 and the transceiver 220 as separate components, it will be appreciated that the processor 218 and the transceiver 220 may be integrated together in an electronic package or chip.

The transmit/receive element 222 may be configured to transmit signals to, or receive signals from, a base station (e.g., the base station 214a) over the air interface 216. For example, in one embodiment, the transmit/receive element 222 may be an antenna configured to transmit and/or receive RF signals. In another embodiment, the transmit/receive element 222 may be an emitter/detector configured to transmit and/or receive IR, UV, or visible light signals, for example. In yet another embodiment, the transmit/receive element 222 may be configured to transmit and receive both RF and light signals. It will be appreciated that the transmit/receive element 222 may be configured to transmit and/or receive any combination of wireless signals.

In addition, although the transmit/receive element 222 is depicted in FIG. 2B as a single element, the WTRU 108 may include any number of transmit/receive elements 222. More specifically, the WTRU 108 may employ MIMO technology. Thus, in one embodiment, the WTRU 108 may include two or more transmit/receive elements 222 (e.g., multiple antennas) for transmitting and receiving wireless signals over the air interface 216.

The transceiver 220 may be configured to modulate the signals that are to be transmitted by the transmit/receive element 222 and to demodulate the signals that are received by the transmit/receive element 222. As noted above, the WTRU 108 may have multi-mode capabilities. Thus, the transceiver 220 may include multiple transceivers for enabling the WTRU 108 to communicate via multiple RATs, such as UTRA and IEEE 802.11, for example.

The processor 218 of the WTRU 108 may be coupled to, and may receive user input data from, the speaker/microphone 224, the keypad 226, and/or the display/touchpad 228 (e.g., a liquid crystal display (LCD) display unit or organic light-emitting diode (OLED) display unit). The processor 218 may also output user data to the speaker/microphone 224, the keypad 226, and/or the display/touchpad 228. In addition, the processor 218 may access information from, and store data in, any type of suitable memory, such as the non-removable memory 206 and/or the removable memory 232. The non-removable memory 206 may include random-access memory (RAM), read-only memory (ROM), a hard disk, or any other type of memory storage device. The removable memory 232 may include a subscriber identity module (SIM) card, a memory stick, a secure digital (SD) memory card, and the like. In other embodiments, the processor 218 may access information from, and store data in, memory that is not physically located on the WTRU 108, such as on a server or a home computer (not shown).

The processor 218 may receive power from the power source 234, and may be configured to distribute and/or control the power to the other components in the WTRU 108. The power source 234 may be any suitable device for powering the WTRU 108. For example, the power source 234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 218 may also be coupled to the GPS chipset 236, which may be configured to provide location information (e.g., longitude and latitude) regarding the current location of the WTRU 108. In addition to, or in lieu of, the information from the GPS chipset 236, the WTRU 108 may receive location information over the air interface 216 from a base station (e.g., base stations 214a, 214b) and/or determine its location based on the timing of the signals being received from two or more nearby base stations. It will be appreciated that the WTRU 108 may acquire location information by way of any suitable location-determination method while remaining consistent with an embodiment.

The processor 218 may further be coupled to other peripherals 238, which may include one or more software and/or hardware modules that provide additional features, functionality and/or wired or wireless connectivity. For example, the peripherals 238 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2C:
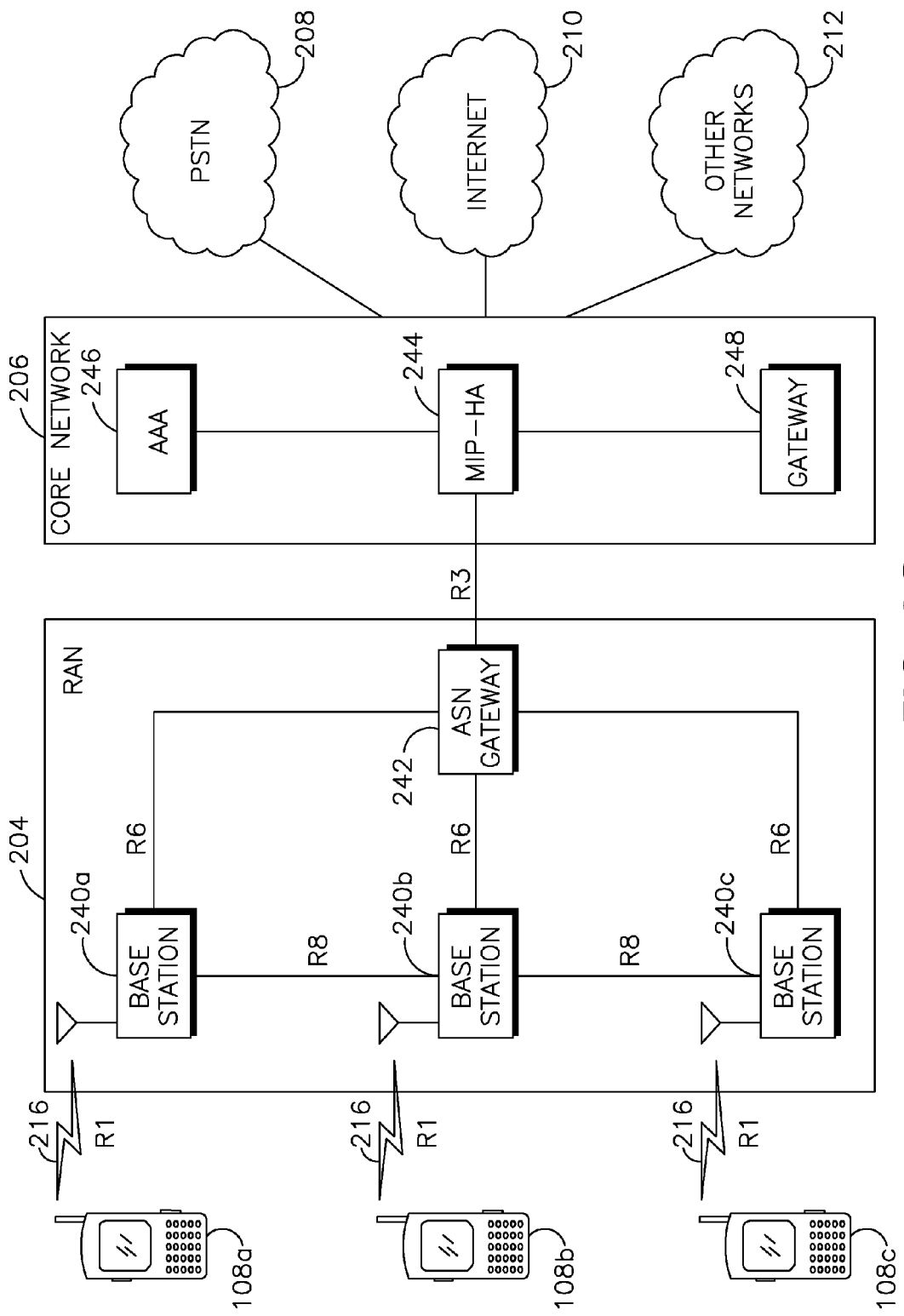
FIG. 2C is a system diagram of an example radio access network and an example core network that may be used within the communications system illustrated in FIG. 2A.

FIG. 2C is a system diagram of the RAN 204 and the core network 206 according to an embodiment. The RAN 204 may be an access service network (ASN) that employs IEEE 802.16 radio technology to communicate with the WTRUs 108a, 108b, 108c over the air interface 216. As will be further discussed below, the communication links between the different functional entities of the WTRUs 108a, 108b, 108c, the RAN 204, and the core network 206 may be defined as reference points.

As shown in FIG. 2C, the RAN 204 may include base stations 240a, 240b, 240c, and an ASN gateway 242, though it will be appreciated that the RAN 204 may include any number of base stations and ASN gateways while remaining consistent with an embodiment. The base stations 240a, 240b, 240c may each be associated with a particular cell (not shown) in the RAN 204 and may each include one or more transceivers for communicating with the WTRUs 108a, 108b, 108c over the air interface 216. In one embodiment, the base stations 240a, 240b, 240c may implement MIMO technology. Thus, the base station 240a, for example, may use multiple antennas to transmit wireless signals to, and receive wireless signals from, the WTRU 108a. The base stations 240a, 240b, 240c may also provide mobility management functions, such as handoff triggering, tunnel establishment, radio resource management, traffic classification, quality of service (QoS) policy enforcement, and the like. The ASN gateway 242 may serve as a traffic aggregation point and may be responsible for paging, caching of subscriber profiles, routing to the core network 206, and the like.

The air interface 216 between the WTRUs 108a, 108b, 108c and the RAN 204 may be defined as an R1 reference point that implements the IEEE 802.16 specification. In addition, each of the WTRUs 108a, 108b, 108c may establish a logical interface (not shown) with the core network 206. The logical interface between the WTRUs 108a, 108b, 108c and the core network 206 may be defined as an R2 reference point, which may be used for authentication, authorization, IP host configuration management, and/or mobility management.

The communication link between each of the base stations 240a, 240b, 240c may be defined as an R8 reference point that includes protocols for facilitating WTRU handovers and the transfer of data between base stations. The communication link between the base stations 240a, 240b, 240c and the ASN gateway 242 may be defined as an R6 reference point. The R6 reference point may include protocols for facilitating mobility management based on mobility events associated with each of the WTRUs 108a, 108b, 108c.

As shown in FIG. 2C, the RAN 204 may be connected to the core network 206. The communication link between the RAN 204 and the core network 206 may defined as an R3 reference point that includes protocols for facilitating data transfer and mobility management capabilities, for example. The core network 206 may include a mobile IP home agent (MIP-HA) 244, an authentication, authorization, accounting (AAA) server 246, and a gateway 248. The MIP-HA 244 may be proxy MIP-HA (PMIP-HA). While each of the foregoing elements are depicted as part of the core network 206, it will be appreciated that any one of these elements may be owned and/or operated by an entity other than the core network operator.

The PMIP-HA 244 may be responsible for IP address management, and may enable the WTRUs 108a, 108b, 108c to roam between different ASNs and/or different core networks. The PMIP-HA 244 may provide the WTRUs 108a, 108b, 108c with access to packet-switched networks, such as the Internet 210, to facilitate communications between the WTRUs 108a, 108b, 108c and IP-enabled devices. The AAA server 246 may be responsible for user authentication and for supporting user services. The gateway 248 may facilitate interworking with other networks. For example, the gateway 248 may provide the WTRUs 108a, 108b, 108c with access to circuit-switched networks, such as the PSTN 208, to facilitate communications between the WTRUs 108a, 108b, 108c and traditional land-line communications devices. In addition, the gateway 248 may provide the WTRUs 108a, 108b, 108c with access to the networks 212, which may include other wired or wireless networks that are owned and/or operated by other service providers.

Although not shown in FIG. 2C, it will be appreciated that the RAN 204 may be connected to other ASNs and the core network 206 may be connected to other core networks. The communication link between the RAN 204 the other ASNs may be defined as an R4 reference point, which may include protocols for coordinating the mobility of the WTRUs 108a, 108b, 108c between the RAN 204 and the other ASNs. The communication link between the core network 206 and the other core networks may be defined as an R5 reference, which may include protocols for facilitating interworking between home core networks and visited core networks.

Figure 2D:
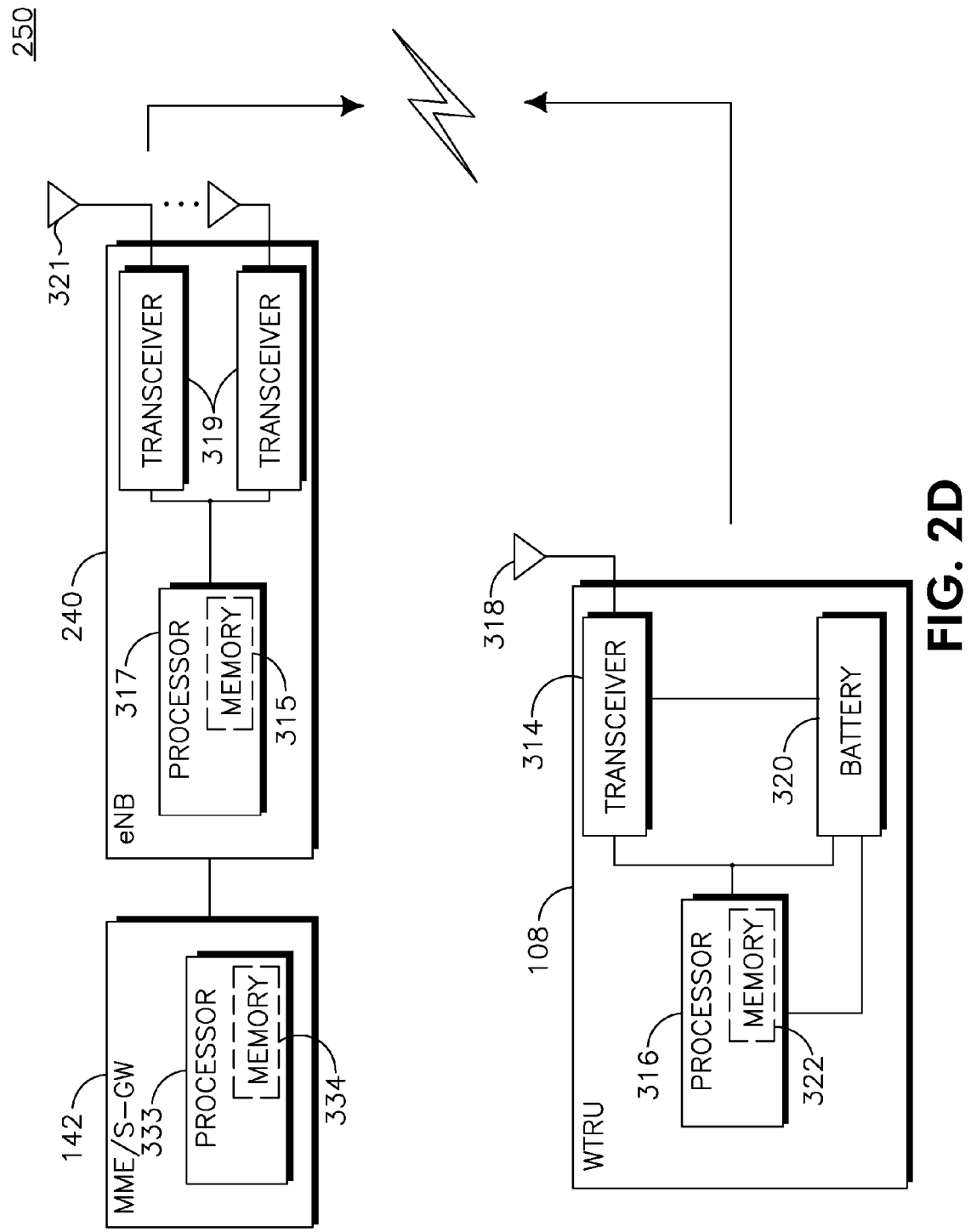
FIG. 2D is an example block diagram comprising components of a multicast mobility network

FIG. 2D is an exemplary block diagram 250 comprising the WTRU 108, the eNB 240, and the Mobility Management Entity (MME)/Serving GateWay (S-GW) 142. As shown in FIG. 2D, the WTRU 108, the eNB 240 and the MME/S-GW 142 are configured to perform a method for multicast mobility.

In addition to the components that may be found in a typical WTRU, the WTRU 108 includes a processor 316 with an optional linked memory 322, at least one transceiver 314, an optional battery 320, and an antenna 318. The processor 316 is configured to perform a method for multicast mobility.

The transceiver 314 is in communication with the processor 316 and the antenna 318 to facilitate the transmission and reception of wireless communications. In case a battery 320 is used in the WTRU 108, it powers the transceiver 314 and the processor 316.

In addition to the components that may be found in a typical eNB, the eNB 240 includes a processor 317 with an optional linked memory 315, transceivers 319, and antennas 321. The processor 317 is configured to perform a method for multicast mobility.

The transceivers 319 are in communication with the processor 317 and antennas 321 to facilitate the transmission and reception of wireless communications. The eNB 240 is connected to the Mobility Management Entity/Serving GateWay (MME/S-GW) 142 which includes a processor 333 with an optional linked memory 334.

Figure 3:
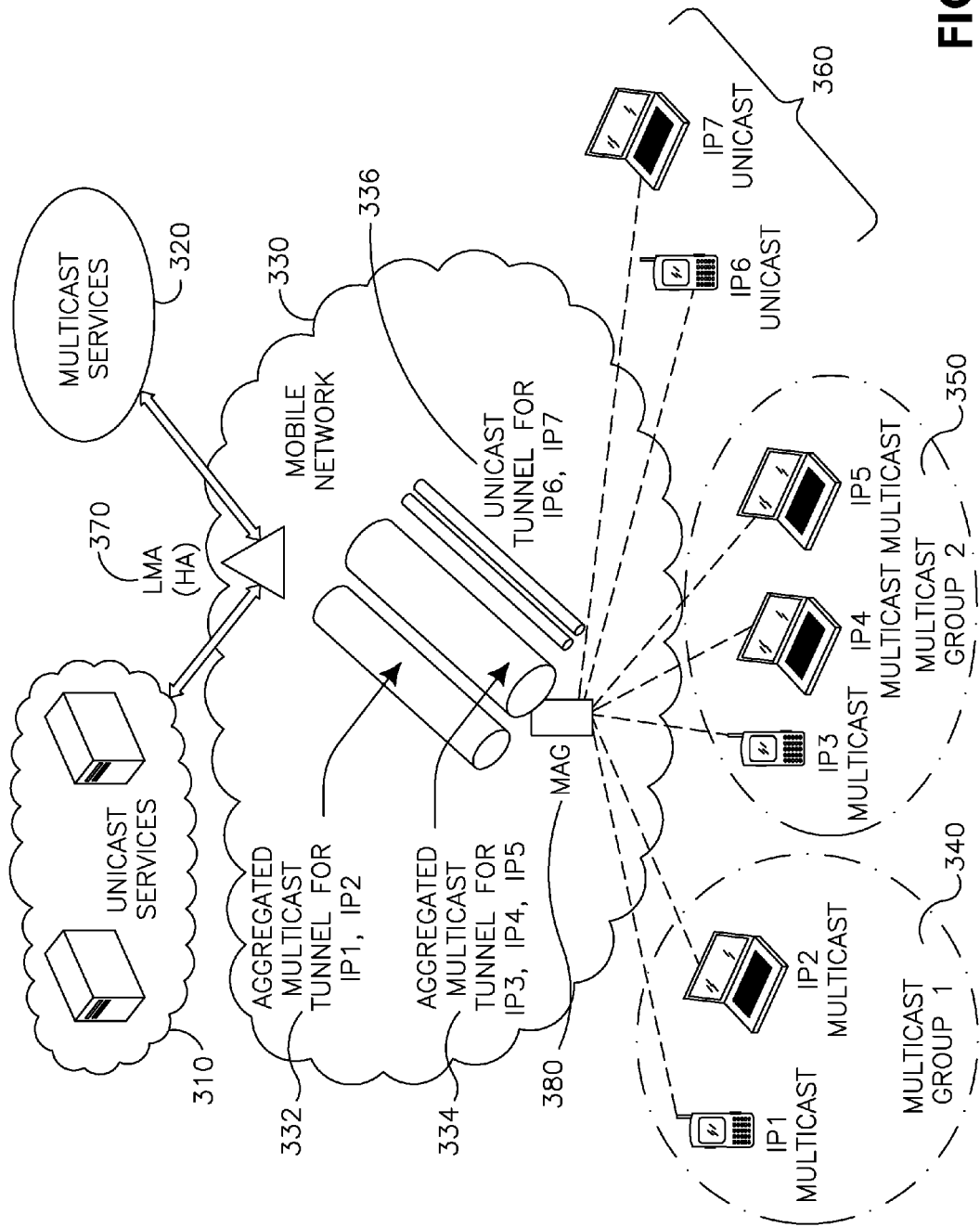
FIG. 3 shows an architecture of a PMIP multicast tunnel aggregation.

Referring to FIG. 3, PMIP tunnels may be aggregated for the multicast WTRUs, for example, the multicast group one 340 and multicast group two 350. If using the exsiting proxy binding update (PBU) message, a new variable-length of multicast options field (i.e., a portion or a segment) may be added to the existing proxy binding update (PBU) message. The PBU is a request message sent by the MAG 380 to a WTRU's respective LMA for establishing a binding between the WTRU's HNP assigned to a predefined interface of a WTRU 340, 350, or 360 and its current CoA (i.e., proxy-CoA). The WTRU's respective LMA may be connected either to the unicast services 310 or the multicast services 320. The multicast options field may contain a multicast CoA. A specific multicast CoA is associated with the aggregated multicast tunnel 334 or 332 ending at the MAG 380. Alternatively, a multicast flag may be added in the PBU message. Alternatively, a new message can be used to signal multicast information.

The multicast aggregated tunnels 332 and 334 may be pre-configured. For example, they may pre-exist between the LMA (Home Agent) 370 and the MAG 380, even before any WTRUs 340, 350, or 360 subscribe to the multicast services. The LMA 370 and the MAG 380 may exchange information indicating that they both support multicast services using the messages described above. Multicast WTRUs 340 and 350 are added to the tunnel at the time they are attached to the mobile network 330.

Alternatively, multicast aggregated tunnels 332 and 334 may be dynamic. Multicast aggregated tunnels do not exist before any multicast services are required. When multiple WTRUs 360 establish unicast tunnels 336 for the multicast services, the LMA 370 and the MAG 380 may combine these unicast tunnels 336 into an aggregated multicast tunnel, 332 or 334.

A WTRU may indicate a request for the multicast services to a MAG in several ways. The WTRU may use existing MLD/IGMP messages to indicate a multicast request to a MAG. Or, the WTRU may include multicast information in a router solicitation message.

Both, the LMA 370 and the MAG 380 may initiate the establishment of the aggregated tunnels for the multicast services. For initiation of tunnel aggregation from the MAG 380 to the LMA 370, a PBU message may be used to initiate the process by adding a flag in the multicast options field, or a new message may be used. Multicast information may be stored at either the LMA 370, or MAG 380, or both. Such multicast related information can be: multicast channels, the WTRUs subscribed to each multicast service, and each WTRU's respective network attachment.

A multicast tunnel may be unidirectional for downlink only traffic, or bi-directional (i.e., uplink and downlink communication). Control information, such as the MLD/IGMP messages, may be sent over unicast tunnels or over aggregated multicast tunnels. For multicast and unicast services, aggregated multicast and unicast tunnels may co-exist between the LMA 370 and the MAG 380. A WTRU 360 with a unicast tunnel may also be associated with a multicast CoA. For example, a WTRU may have unicast tunnels 336 and aggregated multicast tunnels 332, 334.

Further, one or multiple multicast tunnels may exist. Such options may include one multicast tunnel with one multicast CoA to serve all multicast services, multiple multicast tunnels providing to separate different multicast services, or a combination. The MAG 380 may indicate whether multicast service is supported and available in a router advertisement message.

Figure 4:
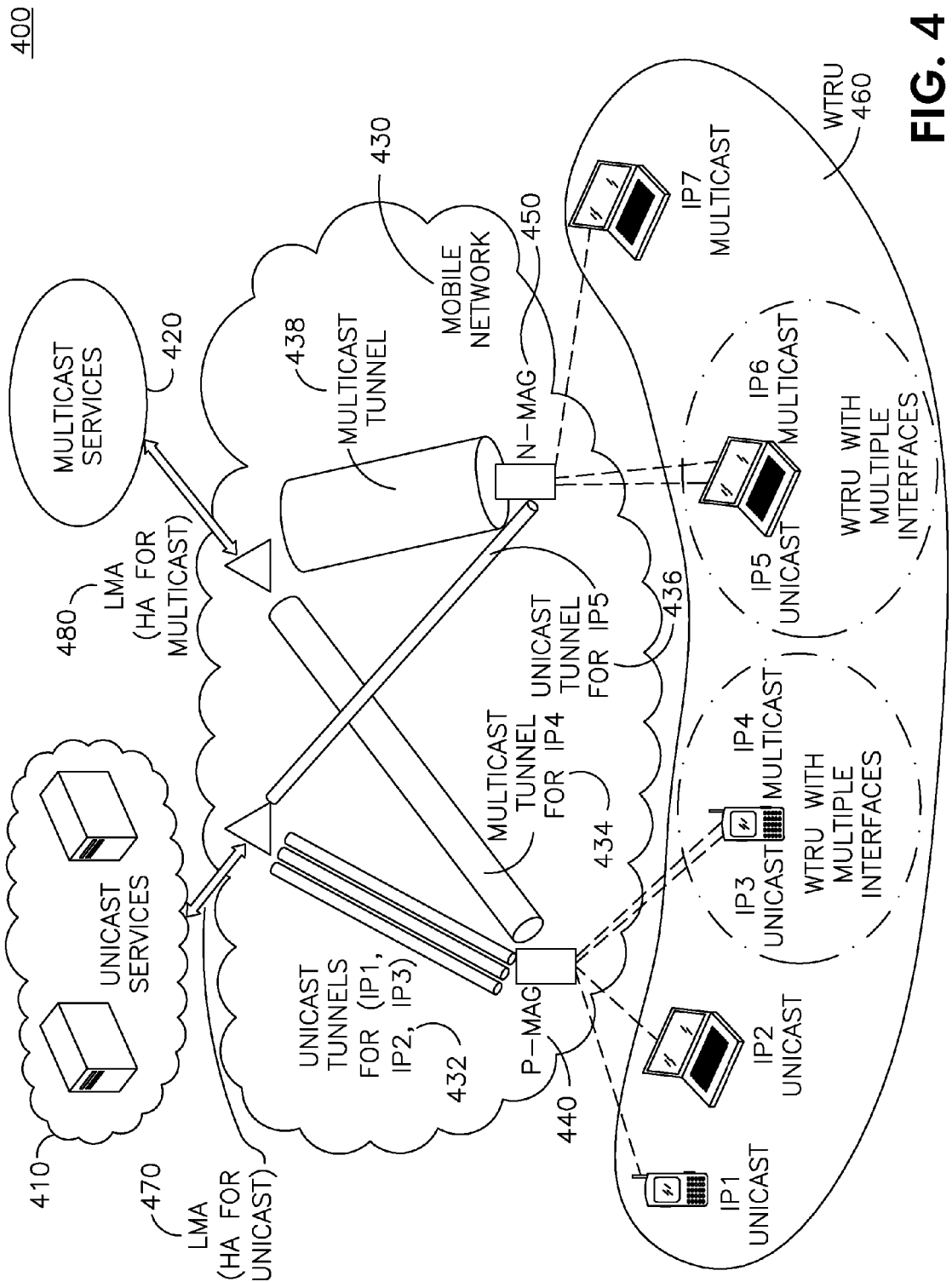
FIG. 4 illustrates a dedicated multicast LMA architecture.

FIG. 4 illustrates a dedicated multicast LMA architecture 400. In this embodiment, there is one LMA 470 dedicated for unicast services 410 and one LMA 480 dedicated for multicast services 420. Multiple LMAs 470 and 480 may be used for each type of service, depending on the deployment of the respective network.

A WTRU 460 may have multiple interfaces. Thus, the WTRU 460 may establish a unicast tunnel 432, 436 with the unicast LMA 470, and a multicast tunnel 434, 438 with the multicast LMA 480, respectively in parallel. A WTRU 460 may have more than one home agent (HA). In this architecture, the division of LMAs is based on a particular service required.

Figure 5A:
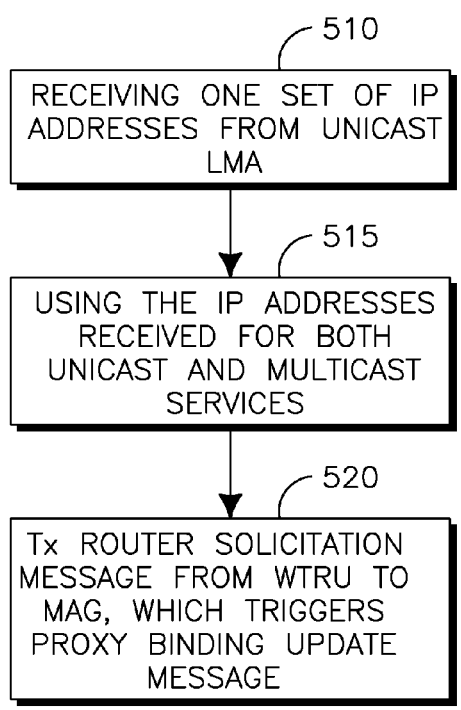
FIGS. 5A and 5B shows flow diagram of the dedicated multicast services as illustrated in FIG. 4.
Figure 5B:
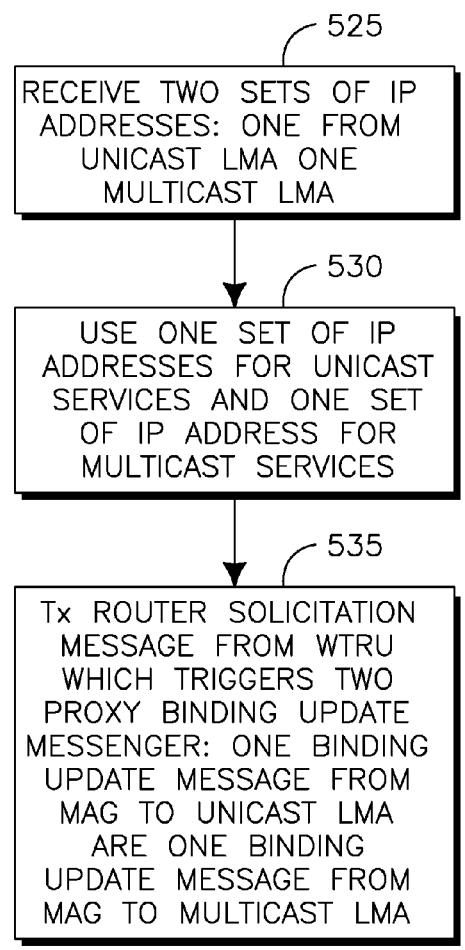

In FIG. 4, a WTRU 460 moves from the p-MAG 440 to the n-MAG 450. Referring to FIG. 5A and FIG. 5B, additional details for the multicast services are described. In this example, at least two methods are described, one in FIG. 5A and another in FIG. 5B, where the IP address assignment is used to support multicast services.

As seen in FIG. 5A, one set of IP addresses is assigned 510 from the LMA HA for unicast 470 to the WTRU 460. The IP addresses are used by the WTRU 460 for both unicast services 410 and multicast services 420. The WTRU 460 transmits the router solicitation message 520 to the serving MAG, which triggers a PBU message from the serving MAG to the unicast LMA 470.

As seen in FIG. 5B, two sets of IP addresses are assigned 525 to the WTRU 460. One set of IP addresses is assigned from the unicast LMA HA 470 for unicast 410 and a different set of IP addresses from the multicast LMA HA 480 for multicast 420. The WTRU 460 transmits the router solicitation message 530 to the serving MAG, which will trigger two PBU messages, one from the serving MAG to the unicast LMA 470 and another to the multicast LMA 480.

In a case where the WTRU 460 does not require unicast services, the WTRU 460 receives the IP addresses from the multicast LMA 480 for multicast services 420 through a single PBU message from the serving MAG to the multicast LMA 480.

A binding update list maintained by a MAG is updated to have entries for a binding of the WTRU with both the unicast LMA 470 for unicast traffic and the multicast LMA 480 for multicast traffic.

The multicast traffic and unicast traffic forwarding may be handled by the MAG by discriminating between the unicast and multicast traffic received related to a specific WTRU. The MAG may be able to discriminate by looking at source or destination addresses. The MAG may forward the traffic on the correct interface.

For example, in FIG. 5A, when there is uplink traffic (i.e., from the WTRU 460 to the serving MAG), the serving MAG is able to determine if it should be forwarded to the unicast LMA 470 for unicast traffic or the multicast LMA 480 for multicast control signaling. For the downlink traffic, since there is only one interface at the WTRU 460, the serving MAG only needs to have a mapping of the tunnels for unicast tunnel and multicast tunnel to the WTRU 460.

As another example in FIG. 5B, when different IP addresses are used for unicast services 410 and multicast services 420, the serving MAG needs to map the tunnels with the interfaces of the WTRU 460, in a manner similar to what it does in the PMIP multihoming case. PMIP allows mobile nodes to connect to a Proxy Mobile IPv6 domain through multiple interfaces for simultaneous access. When a mobile node connects to a Proxy Mobile IPv6 domain through multiple interfaces for simultaneous access, the local mobility anchor allocates a mobility session for each of the attached interfaces. Each mobility session is managed under a separate Binding Cache entry and with its own lifetime. When there exist only multicast services, the serving MAG maps the multicast tunnel with the WTRU 460, in a manner similar to the unicast traffic.

The policy profile of the WTRU 460 stored in the policy server may be updated by storing the IPv6 addresses of the LMA for unicast LMA 470 and LMA for multicast LMA 480. With the use of this information, the serving MAG of the WTRU 460 is able to obtain the multicast LMA addresses.

Alternatively, the MAG may maintain a multicast policy profile, which may map one or many LMA addresses to certain multicast groups, multicast options, or the link. A MAG may be able to attach to multiple LMAs. For example, a MAG may have a mandatory connection to the unicast LMA, and optionally connect to the multicast LMA if the IP address assignment as described in FIG. 5A is used. In this case, the connection to the unicast LMA 470 is mandatory, because that is where the IP address of the WTRU is assigned. A MAG may optionally have a connection to either the unicast LMA 470 or the multicast LMA 480 if the IP address assignment as described in FIG. 5B is used. In this example, the IP addresses of the WTRU 460 may be assigned from either of the LMAs depending on the type of services (either unicast or multicast) required.

Figure 6:
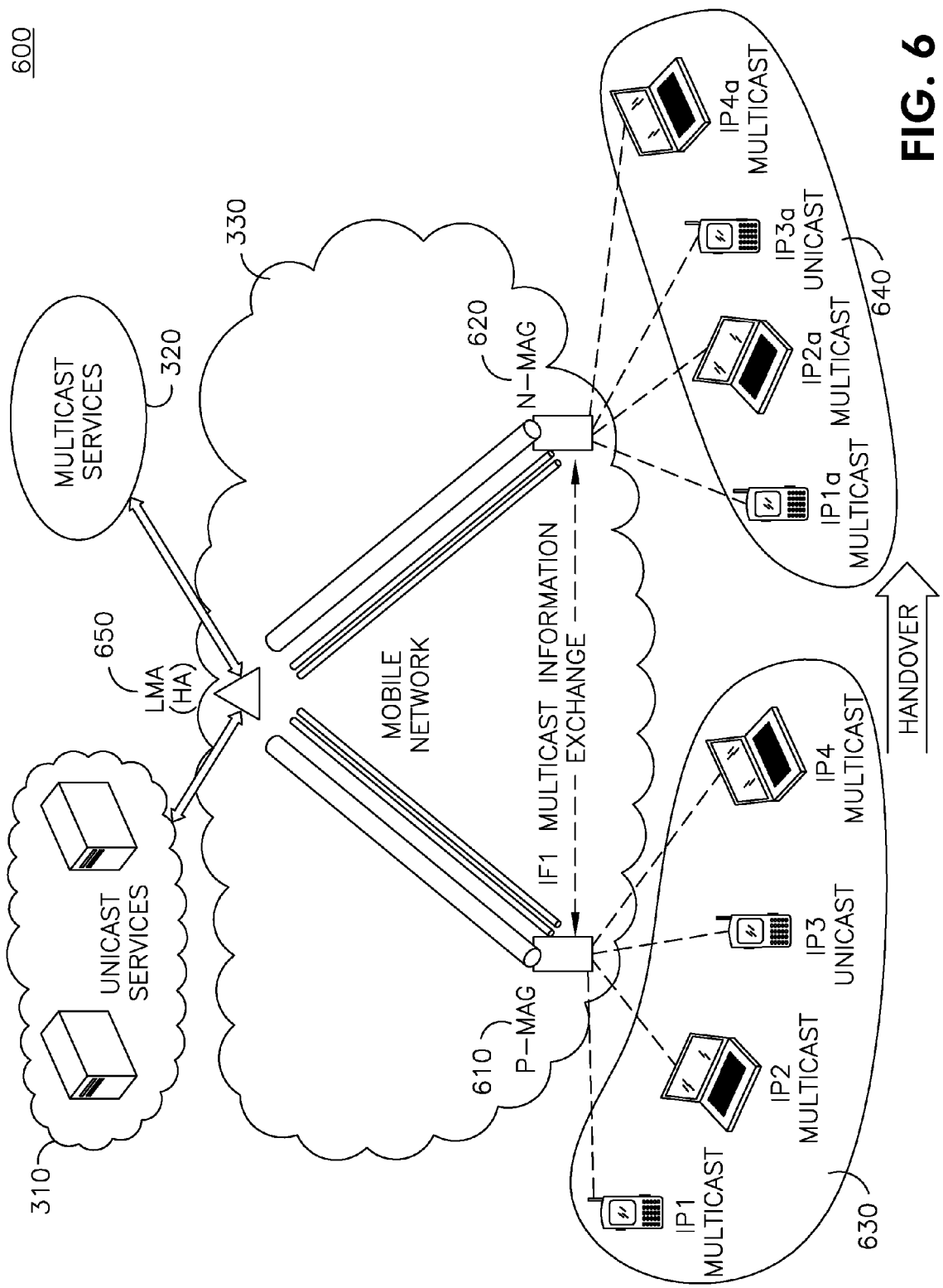
FIG. 6 shows the architecture of PMIP intra-LMA multicast mobility enablement.

FIG. 6 shows the architecture of PMIP intra-LMA multicast mobility enablement 600. The embodiment shown in FIG. 6 is substantially the same as that shown in FIG. 3, except that in this embodiment all or some of the WTRUs 630 move from a previously attached MAG (p-MAG) 610 to a newly attached MAG (n-MAG) 620. An imminent handover (HO) trigger may come from the WTRU or the network, as a result of lower layer signaling, for example, degraded signal strength, increased packet loss, and the like. One example of the lower layer signaling is a link going down message in 802.21.

Figure 7A:
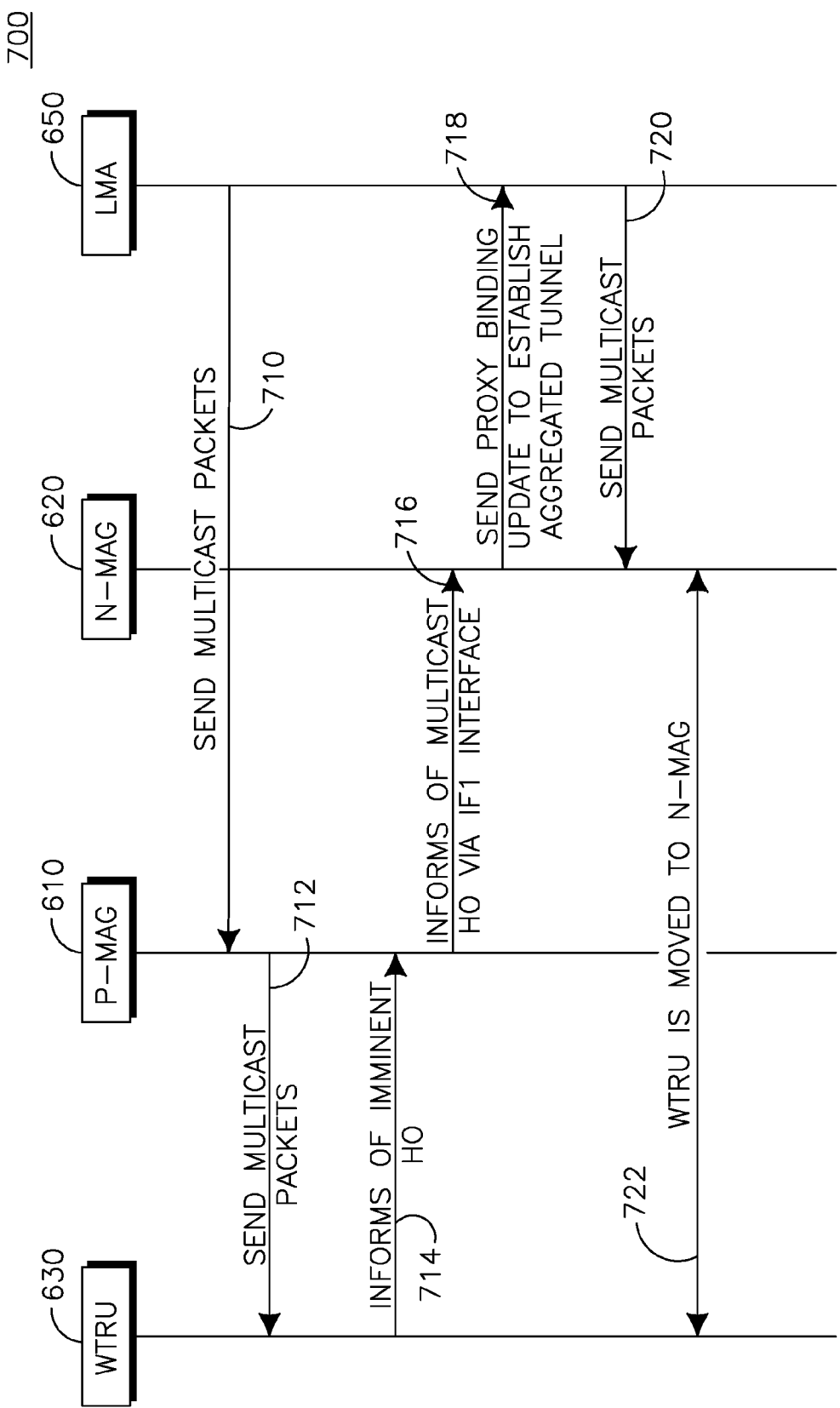
FIGS. 7A and 7B shows a communication between the entities of the network for an intra-LMA multicast mobility as illustrated in FIG. 6.
Figure 7B:
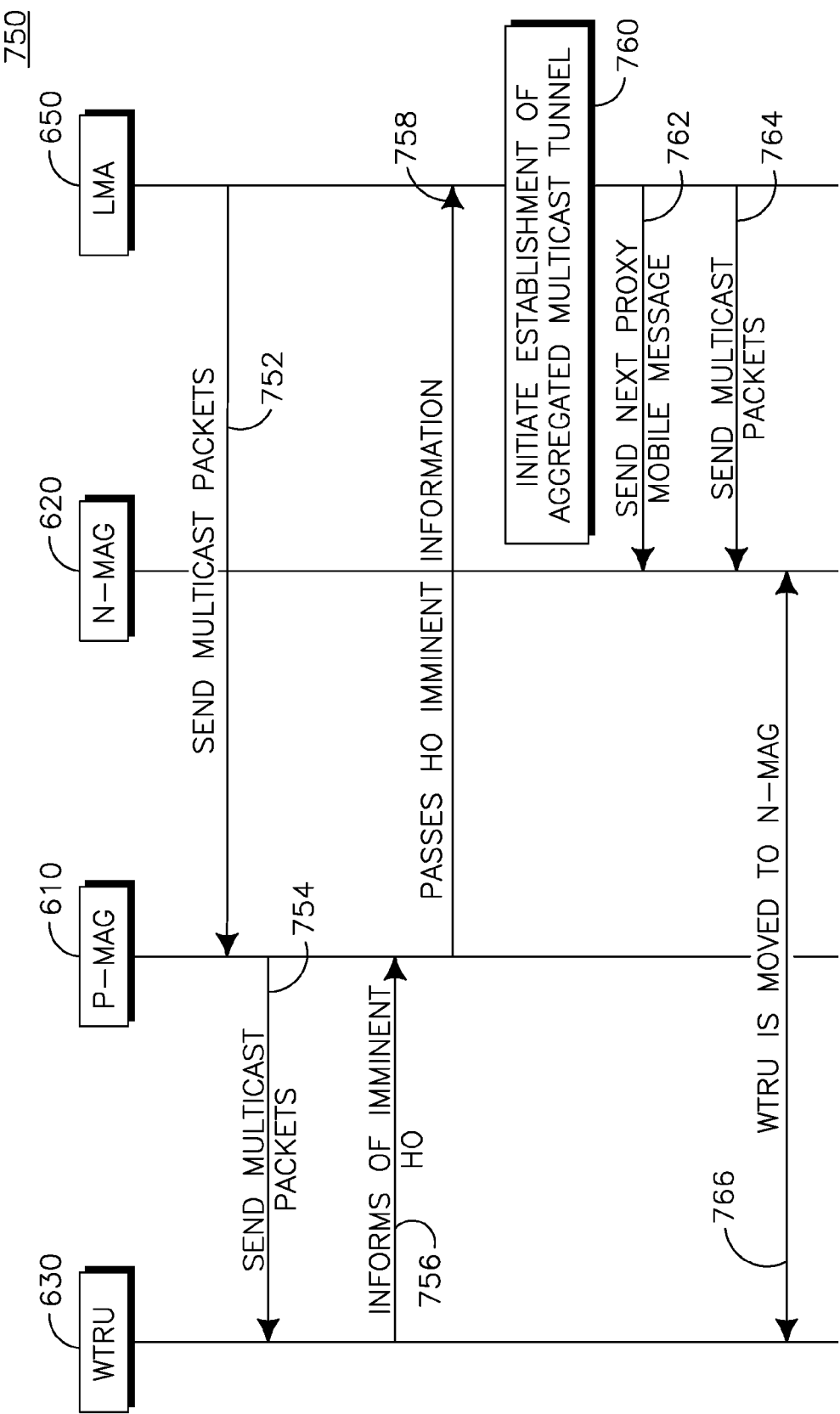

FIGS. 7A and 7B show a communication path for the PMIP intra-LMA multicast mobility 700 and 750, respectively. As seen in FIG. 7A, the LMA 650 sends multicast packets 710 to the p-MAG 610. The p-MAG 610 sends multicast packets 712 to the WTRU 630. The WTRU 630 informs the p-MAG 610 of imminent HO 714. The p-MAG 610 informs the n-MAG 620 of the multicast HO via a new interface, IF1, 716 between the p-MAG 610 and the n-MAG 620. Alternatively, the imminent HO trigger and IF1 interface also apply to unicast services. The n-MAG 620 sends a PBU message to the LMA 650 to establish an aggregated tunnel 718. The multicast options with a multicast CoA are provided to the LMA 650 by the n-MAG 620. The LMA 650 sends multicast packets to the n-MAG 620, prior to actual HO 720. The WTRU 630 which is associated to the pre-established aggregated tunnel moves to the n-MAG 620, and receives multicast packets from the aggregated tunnel 722. On a condition that the aggregated tunnel between the LMA and the p-MAG is not needed, the aggregated tunnel may be removed.

Referring to FIG. 7B, the LMA 650 sends multicast packets 752 to the p-MAG 610. The p-MAG 610 sends multicast packets 754 to the WTRU 630. The WTRU 630 informs the p-MAG 610 of the imminent HO 756. The p-MAG 610 passes the HO imminent information 758 to the LMA 650. The LMA 650 initiates establishment of an aggregated multicast tunnel 760 between the LMA 650 and the n-MAG 620. The LMA sends a Proxy Mobile IP message to the n-MAG to establish the new multicast tunnel 762. On a condition that the LMA is aware of the received imminent HO, the LMA 650 may initiate the establishment of an aggregated multicast tunnel 762 between the LMA 650 and the n-MAG 620. The LMA 650 sends multicast packets to the n-MAG 620, prior to actual HO 764. The WTRU 630 which is associated to the pre-established aggregated tunnel moves to the n-MAG 620, and receives multicast packets from the aggregated tunnel 766. On a condition that the aggregated tunnel between the LMA 650 and the p-MAG 610 is not needed, the aggregated tunnel may be removed.

Alternatively, the imminent HO trigger may come from the network. The trigger may be a result of the network load balancing or for a maintenance purpose (e.g., the p-MAG is going to be shutdown). The network trigger may come to the LMA 650 or the p-MAG 610. On a condition that the p-MAG 610 is aware of the received imminent HO, the p-MAG 610 may inform the LMA 650 of the HO directly, or inform the n-MAG 620 of the HO. This embodiment proceeds similarly to the embodiment above related to FIGS. 7A and 7B, where handover is triggered by a WTRU.

Alternatively, after the establishment of the aggregated tunnel 762, multicast traffic is sent from the LMA 650 to the n-MAG 620. The n-MAG 620 may send a PBU message to the LMA 650 after the WTRU 630 is detected on the network. However, this may cause a longer delay compared to the method mentioned above where the tunnel is first pre-established and then multicasting is started.

In another alternative embodiment, a multicast group 'join' message is transmitted on the targeted network before a HO. The multicast information obtained by the n-MAG 620 prior to the actual HO, as described above in FIGS. 7A and 7B, may facilitate n-MAG 620's enablement of multicast services before the attachment of the WTRU. The multicast information obtained by the n-access router (n-AR), on a condition that the PMIP is not used, prior to the actual HO may facilitate n-AR enablement of the multicast services before the attachment of the WTRU.

In another alternative, a mobility management entity in the network is informed of the imminent HO. The mobility management entity joins the multicast group listened to by the WTRU with the appropriate multicast router on the targeted network before triggering the HO.

Another alternative utilizes a fast triggering multicast group 'join' message after Layer 3 HO. The mobility management entity, that controls the HO triggers the sending of a MLD/IGMP report to join the multicast group as soon as the HO is complete. This is done immediately, instead of waiting for a query from the multicast router, and thus reducing the delay before resuming the multicast services.

These embodiments may be used independently or jointly. For example, when they are used together, and the multicast group 'join' prior to HO did not work, the fast triggering multicast group 'join' message after HO may succeed in reducing the service delay.

Figure 8:
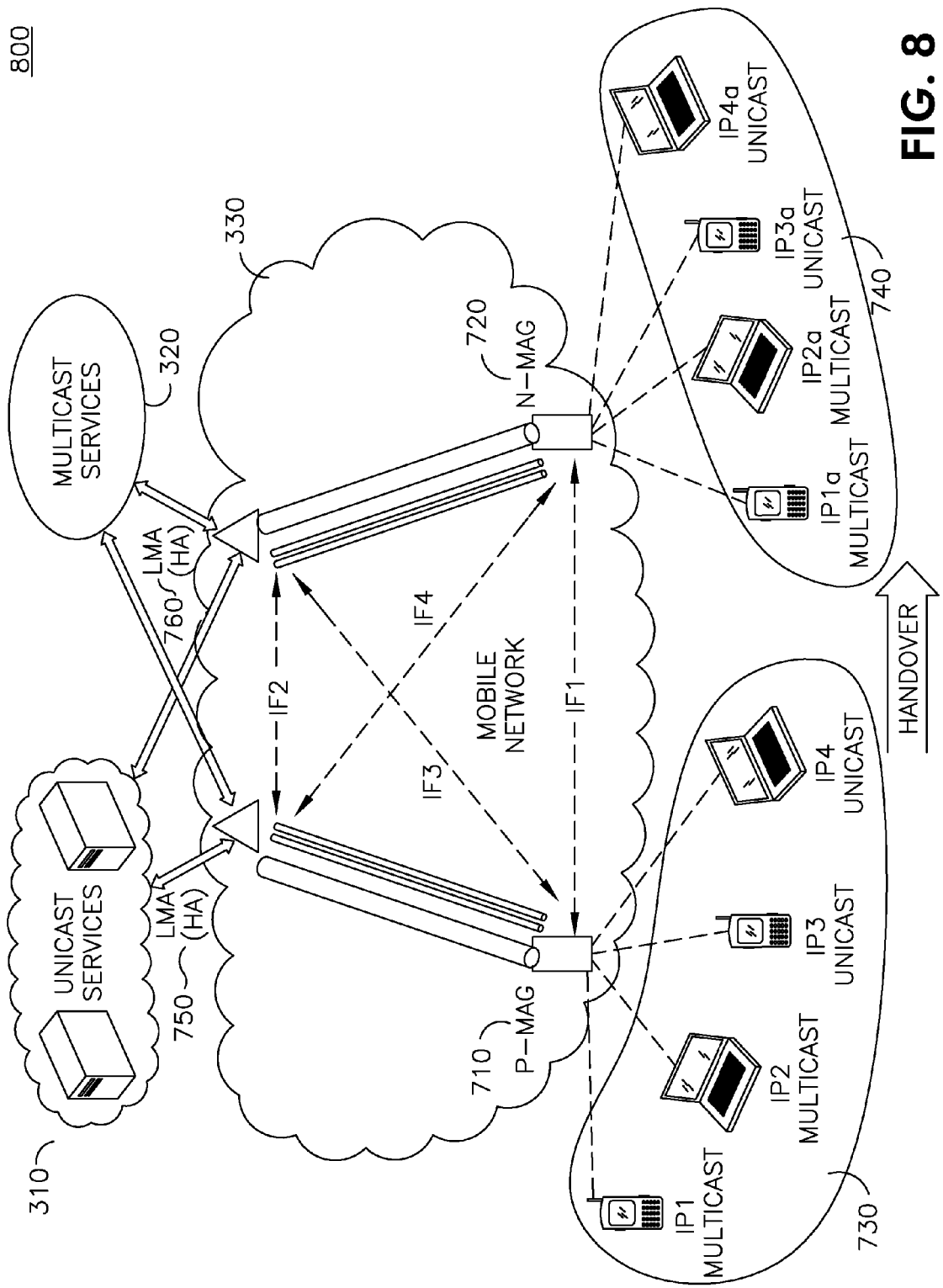
FIG. 8 shows the architecture of PMIP inter-LMA multicast mobility enablement.

FIG. 8 shows the architecture of PMIP inter-LMA multicast mobility enablement 800. In this embodiment, the WTRUs 730 move from the p-MAG 710 to the n-MAG 720. The p-MAG 710 and the n-MAG 720 belong to different LMAs, LMA 750 and LMA 760, respectively. Each LMA 750 and LMA 760 may provide both unicast and multicast services. The method described in FIG. 6 for a single LMA multicast mobility is used in conjunction with additional interfaces to inform the target LMA 750 and 760 to enable the required multicast services. The interface IF1 is used for multicast information exchange between the source and target MAGs, 710 and 720. The interface IF2 is used for multicast information exchange between the source and the target LMAs, 750 and 760. The interface IF3 is used for multicast information exchange between the source MAG 710 and the target LMA 760. The interface IF4 is used for multicast information exchange between the source LMA 750 and the target MAG 720. These interfaces are alternatives and may not be available at the same time.

Figure 9:
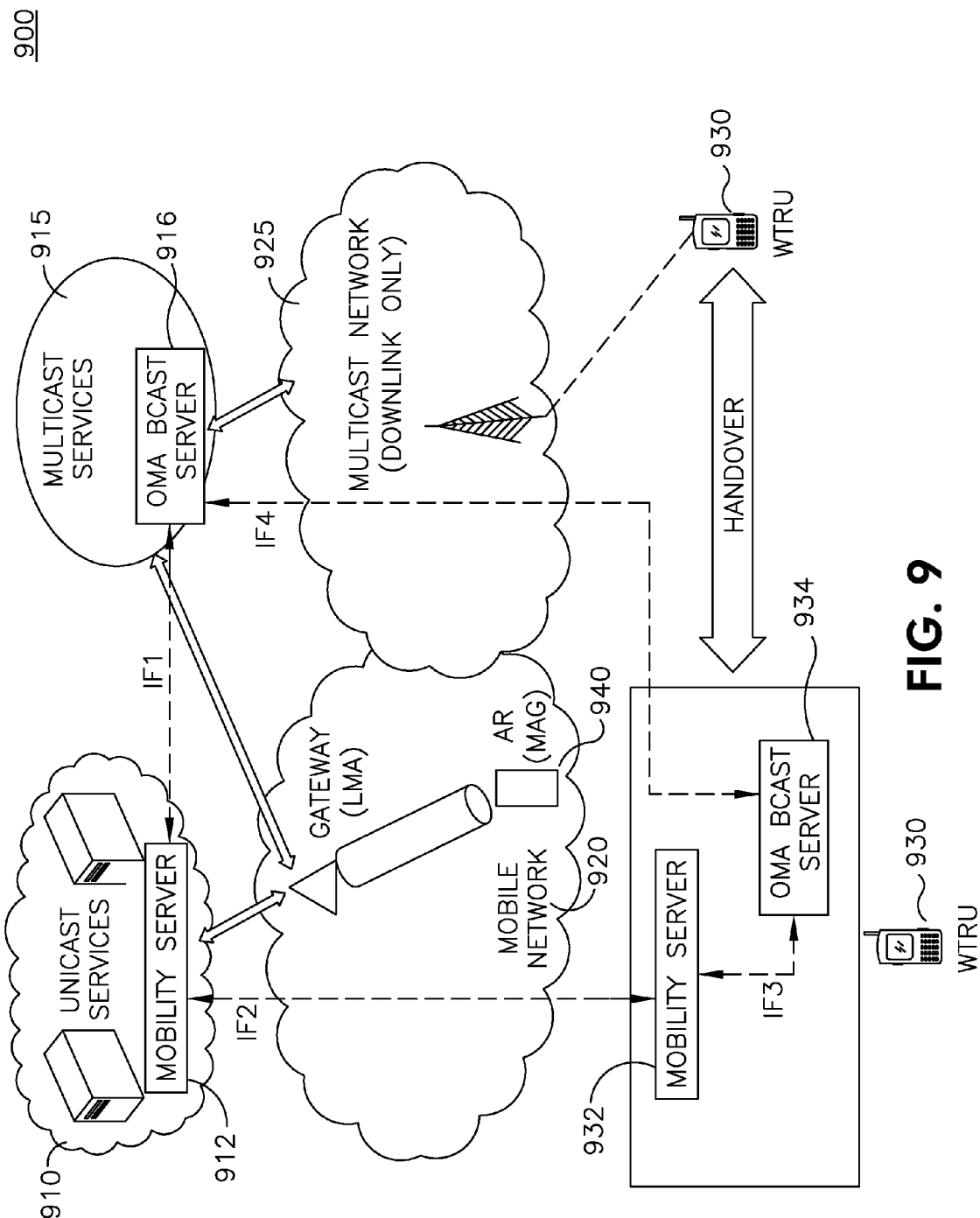
FIG. 9 shows the architecture of multicast mobility in a hybrid network.

FIG. 9 extends a single type of network to a hybrid network for the mobility 900. Referring to FIG. 9, a bi-directional mobile network combined with a downlink only multicast network 925 is shown. In such a hybrid network, HO may occur from the bi-directional network to a downlink only multicast network 925. In a first example, the HO is WTRU 930 triggered, using interface IF3 and interface IF4. A mobility client entity 932 in the WTRU 930 detects the imminent HO. The mobility client 932 informs a multicast service entity 934 (e.g., OMA BCAST functionalities 934 in the WTRU) via the interface IF3. The multicast service entity 934 informs its counter part 916 in the network 915 (e.g., OMA service adaptation/distribution functionalities in the network) of the imminent HO via the interface IF4, and requires service distribution in the downlink only network 925. The interface IF4 may be a new interface, or it may be an existing OMA BCAST-5 interface with enhancement to support the HO information.

In another example, the HO is WTRU 930 triggered, using interfaces IF1 and IF2. A mobility client entity 932 in the WTRU 930 detects the imminent HO. The mobility client entity 932 informs the mobility server 912 in the network 910 (e.g., a media independent handover (MIH) server is an example of mobility server) of the imminent HO via the interface IF2. The interface IF2 may be a new interface, or it may use an existing interface such as a MIH protocol. The mobility server 912 may be located in the unicast service network 910, multicast service network 915, or in a different domain from the unicast or multicast networks. The mobility server 912 informs the OMA BCAST server 916 of the imminent HO and requires service distribution in the downlink only network 925 via the interface IF1. The interface IF1 is a new interface.

In a third example, the network 920 triggers a HO using the interface IF1. In this case the mobility server 912 may inform the OMA BCAST 916 via the interface IF1. In a fourth example, the network 920 triggers a HO using the interface IF2, interface IF3, and interface IF4. On a condition that the interface IF1 does not exist, the mobility server 912 may inform the mobility client entity 932 using the interface IF2. The mobility client 932 informs the OMA BCAST client 934 using the interface IF3 and the OMA BCAST client 934 informs the OMA BCAST server 916 using the interface IF4.

In a fifth example, mobility is supported from the MAG 940 or the LMA 935 in the distribution network.

A MAG (AR or PMIP) 940 and an LMA (Gateway) 935 may get information about a plurality of WTRUs 930 including the respective mobility and multicast services information. The MAG 940 and the LMA 935 may interface with the multicast service network 915, or multicast distribution network (downlink only) 925 to ensure the delivery of the multicast services when a WTRU 930 moves to the downlink only multicast network 925.

The HO may occur from a downlink only multicast network 925 to a bi-directional network 920. The network triggers the HO. The WTRU is informed of the HO in the downlink control information. An imminent HO indication (i.e., information) is passed to the bi-directional network via interfaces in the network side, such as IF1. Alternatively, the WTRU 930 triggers the HO. An uplink connection is required for the WTRU 930 to inform the network of the imminent HO. The interfaces described above for the HO from a bi-directional network 920 to a downlink only network 925 may be used to pass the HO information from the WTRU 930 to the network.

The methods, examples, and embodiments described related to FIG. 9 for mobility in hybrid networks do not assume any L3 or L2 mobility method, PMIP may or may not be used.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method for a proxy mobile Internet Protocol (PMIP) supporting a mobile access gateway (MAG), the method comprising:
   receiving a first packet with a first Internet Protocol (IP) address from a first local mobility anchor (LMA) and a second packet with a second IP address from a second LMA, wherein the first LMA is a multicast LMA for multicast traffic and the second LMA is a unicast LMA for unicast traffic;
   routing the first packet and the second packet to a wireless transmit/receive unit (WTRU) utilizing both unicast services and multicast services;
   receiving a router solicitation message from the WTRU; and
   maintaining a binding update list including entries for a binding of the WTRU with the first LMA and the second LMA.

2. The method as in claim 1 further comprising triggering an indication of a first proxy binding update (PBU) message to the first LMA and a second PBU message to the second LMA.

3. The method as in claim 1 further comprising discriminating between a unicast service traffic and a multicast service traffic to forward traffic to an appropriate interface.

4. The method as in claim 3 further comprising initiating establishment of a unicast tunnel and a multicast tunnel.

5. The method as in claim 4 wherein the multicast tunnel is unidirectional for downlink only traffic or bidirectional traffic.

6. A mobile access gateway (MAG) comprising:
   a first receiver configured to receive a first packet with a first Internet Protocol (IP) address from a first local mobility anchor (LMA) and a second packet with a second IP address from a second LMA, wherein the first LMA is a multicast LMA for multicast traffic and the second LMA is a unicast LMA for unicast traffic;
   a router configured to route the first packet and the second packet to a wireless transmit/receive unit (WTRU) utilizing both unicast and multicast services;
   a second receiver configured to receive a router solicitation message from the WTRU; and
   a processor configured to maintain a binding update list including entries for a binding of the WTRU with the first LMA and the second LMA.

7. The MAG as in claim 6 wherein the processor is further configured to trigger an indication of a first proxy binding update (PBU) message to the first LMA and a second PBU message to the second LMA.

8. The MAG as in claim 6 wherein the processor is further configured to discriminate between a unicast service traffic and a multicast service traffic to forward traffic to an appropriate interface.

9. The MAG as in claim 8 wherein the processor is further configured to initiate establishment of a unicast tunnel and a multicast tunnel.

10. The MAG as in claim 9 wherein the multicast tunnel is unidirectional for downlink only traffic or bidirectional traffic.

11. A unicast local mobility anchor (LMA) comprising:
   a processor configured to assign a packet with an Internet Protocol (IP) address to a wireless transmit/receive unit (WTRU), wherein the IP address is utilized for unicast services and the processor is further configured to initiate establishment of an aggregated multicast tunnel;
   a receiver configured to receive data from a server; and
   a transmitter configured to transmit the received data to the WTRU through a mobile access gateway (MAG) using the aggregated multicast tunnel.

12. The unicast LMA as in claim 11 wherein on a condition that an existing proxy binding update (PBU) message is used, a new variable-length of multicast options field is added to the existing PBU message, and wherein a multicast flag is added in the existing PBU message.

13. The unicast LMA as in claim 11 wherein the aggregated multicast tunnel is unidirectional for downlink only traffic or bidirectional traffic.

14. A multicast local mobility anchor (LMA) comprising:
   a processor configured to assign a packet with an Internet Protocol (IP) address to a wireless transmit/receive unit (WTRU), wherein the IP address is utilized for multicast services and the processor is further configured to initiate establishment of an aggregated multicast tunnel;
   a receiver configured to receive data from a server; and
   a transmitter configured to transmit the received data to the WTRU through a mobile access gateway (MAG) using the aggregated multicast tunnel.

15. The multicast LMA as in claim 14 wherein on a condition that an existing proxy binding update (PBU) message is used, a new variable-length of multicast options field is added to the existing PBU message, and wherein a multicast flag is added in the existing PBU message.

16. The multicast LMA as in claim 14 wherein the aggregated multicast tunnel is unidirectional for downlink only traffic or bidirectional traffic.

* * * * *